(12) United States Patent
Sandler et al.

(10) Patent No.: US 9,370,915 B2
(45) Date of Patent: Jun. 21, 2016

(54) COMPOSITE MATERIAL

(75) Inventors: Jan Kurt Walter Sandler, Heidelberg (DE); Tobias Heinz Steinke, Speyer (DE); Tatiana Ulanova, Ludwigshafen (DE); Klaus Hahn, Kirchheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/313,087

(22) Filed: Dec. 7, 2011

(65) Prior Publication Data

US 2012/0164431 A1 Jun. 28, 2012

Related U.S. Application Data

(60) Provisional application No. 61/420,343, filed on Dec. 7, 2010.

(51) Int. Cl.
| | |
|---|---|
| *B32B 3/26* | (2006.01) |
| *E04B 1/78* | (2006.01) |
| *E04B 1/84* | (2006.01) |
| *B32B 5/18* | (2006.01) |
| *B32B 5/30* | (2006.01) |
| *C01B 33/155* | (2006.01) |

(52) U.S. Cl.
CPC ... *B32B 5/18* (2013.01); *B32B 5/30* (2013.01); *C01B 33/155* (2013.01); *B32B 2264/102* (2013.01); *B32B 2264/12* (2013.01); *B32B 2266/0228* (2013.01); *B32B 2266/0278* (2013.01); *B32B 2307/304* (2013.01); *C01P 2006/14* (2013.01); *C01P 2006/17* (2013.01); *Y10T 428/249953* (2015.04)

(58) Field of Classification Search
USPC ............ 428/316.6, 319.3, 319.7; 252/62
See application file for complete search history.

(56) References Cited

U.S. PATENT DOCUMENTS

| | | | |
|---|---|---|---|
| 5,137,927 A | 8/1992 | Wolff et al. | |
| 5,656,195 A | 8/1997 | Mielke et al. | |
| 5,911,658 A * | 6/1999 | Yoldas | 516/101 |
| 6,077,588 A * | 6/2000 | Koslow et al. | 428/114 |
| 6,080,475 A | 6/2000 | Frank et al. | |
| 6,121,336 A | 9/2000 | Okoroafor et al. | |
| 6,143,400 A | 11/2000 | Schwertfeger et al. | |
| 6,603,055 B2 * | 8/2003 | Mitchell et al. | 604/372 |
| 2005/0192366 A1 * | 9/2005 | Ou et al. | 521/64 |
| 2007/0259979 A1 | 11/2007 | Lee | |
| 2010/0102251 A1 * | 4/2010 | Ferrini et al. | 250/484.4 |
| 2010/0152692 A1 * | 6/2010 | Ong et al. | 604/368 |

FOREIGN PATENT DOCUMENTS

| | | |
|---|---|---|
| DE | 4441567 A1 | 5/1996 |
| DE | 195 33 564 A1 | 3/1997 |
| EP | 0340707 A2 | 11/1989 |
| EP | 489319 A2 | 6/1992 |
| EP | 672635 A1 | 9/1995 |
| WO | WO-2007/011988 A2 | 1/2007 |

OTHER PUBLICATIONS

Nanogel paper from Cabot Corporation, 2009, 2 pages.*
International Search Report for PCT/EP2011/071837 dated Feb. 22, 2012.

* cited by examiner

*Primary Examiner* — Hai Vo
(74) *Attorney, Agent, or Firm* — Drinker Biddle & Reath LLP

(57) ABSTRACT

The invention relates to an aerogel composite material, a process and a composition for producing the composite material and the use of the composite material.

18 Claims, No Drawings

COMPOSITE MATERIAL

CROSS-REFERENCE TO RELATED APPLICATIONS

This Application claims the benefit of U.S. Provisional Application 61/420,343 filed on Dec. 7, 2010, which is incorporated by reference.

BACKGROUND OF THE INVENTION

This invention relates to a composite material comprising nanoporous particles, more particularly an aerogel composite material, a process and a composition for producing the composite material, and also the use of the composite material.

Aerogels and aerosils are highly porous solid bodies in that the predominant portion of their volume consists of pores. Aerogels can be based for example on silicate but also on plastics or carbon. The diameter of aerogel pores is in the nanometer range. Owing to their high pore volume, aerogels are particularly useful as insulating materials combining outstanding insulation properties with low density. Aerogels are initially present as particles, and can be subjected with the use of binders to a shaping process to form plates by pressing for example.

Aerogels are also described in the literature as gels with air as dispersion medium. Aerogels are obtainable by drying a suitable gel. Aerogel in the context of the present invention also comprehends xerogels and cryogels. The shaping process of the aerogel is concluded during the sol-gel transition. Once the solid gel structure has become developed, the outer form can only be changed by comminution, for example grinding.

EP-A-0 340 707 discloses insulating materials from 0.1 to 0.4 g/cm$^3$ in density with good thermal insulation capacity and sufficiently high compressive strength, which are obtained by adhering silica aerogel particles together using an organic or inorganic binder. Cement, gypsum, lime or water-glass are mentioned as examples of suitable inorganic binders.

EP 489 319 A2 discloses composite foams based on silica aerogel particles and a styrene polymer foam. U.S. Pat. No. 6,121,336 discloses improving the properties of polyurethane foams by incorporation of silica aerogels. DE 44 41 567 A1 discloses composite materials from aerogels and inorganic binders where the aerogel particles have corpuscle diameters of less than 0.5 mm. EP 672 635 A1 discloses shaped articles from silica aerogels and binders that additionally utilize sheet-silicates or clay minerals. U.S. Pat. No. 6,143,400 discloses composite materials from aerogel particles and an adhesive that utilize aerogel particles having diameters less than 0.5 mm. DE 105 335 64 A1 discloses composite materials comprising aerogel particles, binders and a fiber agent. WO 2007/011988 A2 discloses compositions with so-called hybrid aerogel particles and a binder wherein the aerogel particles may form covalent bonds with the binder.

However, producing shaped articles of this type frequently necessitates the use of high binder contents. In addition, many performance characteristics such as, for example, thermal conductivity or breaking strength are still in need of improvement. There are frequently also issues with the production of shaped articles. Numerous organic binders cannot be used on account of their high viscosity. The use of low-viscosity dispersions frequently requires an excessive degree of dilution with aqueous solvents, which has the disadvantage that the binder in the dispersions does not enter any bond with the generally hydrophobic silica aerogel particles owing to the absence of aerogel surface wetting.

DETAILED DESCRIPTION OF THE INVENTION

The problem addressed by this invention was therefore that of providing composite materials which can combine a relatively low binder content with an improved, reduced thermal conductivity and a low density. The composite materials shall also be obtainable in a simple manner, for example through improved utility of organic binders.

The invention provides a composite material comprising nanoporous, more particularly granular, particles, more particularly an aerogel, and a crosslinked binder based on a binder and a crosslinker, wherein the binder is a polymer substituted with amino groups.

The invention further provides a process for producing the composite material, which comprises mixing the nanoporous, more particularly granular, particles, more particularly the aerogel, the binder and the crosslinker, performing the crosslinking by reacting the crosslinker with the amino groups of the binder, and the material obtained is either a) subjected directly to a shaping operation and optionally curing, or
b) pelletized, stored and subjected to shaping and curing as or when required.

The invention further provides a composition for producing a composite material, comprising nanoporous, more particularly granular, particles, more particularly an aerogel, binder and a crosslinker, wherein the binder is a polymer substituted with amino groups.

In the context of the present invention, unless otherwise stated, the terms used are defined as follows and the parameters mentioned are measured as follows:

Particle: Particles are corpuscles which either are monolithic, i.e., consist of one piece, or alternatively comprise essentially particles having a diameter smaller than that of the corpuscle, which are optionally bonded together by a suitable binder or joined together by pressing to form larger corpuscles.

Porosity: Ratio of void volume to overall volume, as measured by nitrogen adsorption and desorption (<100 nm) and mercury porosimetry (>100 nm)

Hydrophobic: Hydrophobic substances in the context of the present substances are such substances as have a contact angle of more than 90° with water at room temperature.

Nanoporous: is to be understood as meaning that the pores in the particles have a size in the range from 0.1 to 500 nm, more particularly <200 nm and more preferably <100 nm (d50) and the porosity is from 50 to 99, more particularly from 70 to 99 and more preferably from 80 to 99.

Granular: is to be understood as meaning that the corpuscles are present in a size of 0.1 μm to 100 mm and preferably of 1 μm to 30 mm (d50) and the ratio of the longest axis to the shortest axis of the particles is preferably in the range from 4:1 to 1:1.

Aerosil: is to be understood as referring to pyrogenous silica obtainable by hydrolysis of silicon tetrachloride and preferably having a primary particle size of 5-50 nm (d50).

Molecular weight: The reported molecular weights are based on the number average Mn.

$D_{50}$ value: Size than which 50% of the particles are finer and 50% are larger.

Preferred embodiments of the present invention will now be recited, while the specifically recited embodiments shall also be combinable.

The proportion of nanoporous particles in the composite material is preferably in the range from 1% to 99.9% by volume, more preferably in the range form 5 to 99% and even more preferably in the range from 20 to 99%.

Nanoporous Particles

Preferred nanoporous particles are granular. The nanoporous particles in further preferred embodiments are aerogels or aerosils. These can be organic, inorganic or organic-inorganic.

Aerogel

Suitable aerogels for the composite materials of the present invention are more particularly those based on oxides, more particularly silicon dioxide and metal oxides, more particularly alumina, titania and zirconia, or those based on organic substances, for example melamine-formaldehyde condensates (U.S. Pat. No. 5,086,085), resorcinol-formaldehyde condensates (U.S. Pat. No. 4,873,218) and also aerogels obtainable by polymerization of furfural with phenolic novolak resins. Of particular suitability are compounds which are suitable for sol-gel technology, see for example WO 97/10188 A1, page 7, first paragraph, for example silicon or aluminum compounds. However, they can also be based on mixtures of materials mentioned above. Preference is given to using aerogels comprising silicon compounds. Particular preference is given to aerogels comprising $SiO_2$ and more particularly $SiO_2$ aerogels, which are optionally organomodified.

Preferred aerogels have the following parameters:

Porosity: 50 to 99%, especially 70 to 99%, more preferably 80 to 99%

Density: from 30 to 300 g/L, preferably 150 g/L

Particle diameter: from 0.1 to 100 μm, preferably from 1 to 30 μm ($d_{50}$)

Pore diameter: 0.1 to 500 nm, especially <200 nm, more preferably <100 nm.

In addition, the thermal conductivity of aerogels decreases with increasing porosity and decreasing density, down to a density in the region of 0.1 g/cm³. Therefore, aerogels with porosities above 60% and densities between 0.1 and 0.4 g/cm³ are preferable. The thermal conductivity of granular aerogel should preferably be less than 40 mW/m*K and more preferably less than 25 mW/m*K.

Particularly preferred aerogels are silica aerogels that consist essentially of amorphous silicon dioxide but, depending on their method of making, may further comprise organic compounds.

Silica aerogel particles are obtainable in the known manner from waterglass solution via the stages of silica hydrogel, solvent exchange and subsequent supercritical drying. The bead form generally present is the result of a fast-gelling silica sol being sprayed from a specially designed die and the drops gelling in flight. Further details on this are described in DE-A-21 03 243. The exchange of hydrogel water for other liquids that are chemically inert with regard to silicon dioxide is described for example in U.S. Pat. No. 2,093,454, U.S. Pat. No. 3,977,993 and JP-A-53/025 295.

The aerogel particles can be used in monomodal, bimodal or multimodal distribution.

In a preferred embodiment, the aerogel particles have hydrophobic groups on the surface. Suitable groups for durable hydrophobicization are for example trisubstituted silyl groups of general formula —Si(R)$_3$, preferably trialkyl- and/or triarylsilyl groups, where each R is independently a nonreactive organic moiety such as $C_1$-$C_{18}$ alkyl or $C_6$-$C_{14}$ aryl, preferably $C_1$-$C_6$ alkyl or phenyl, more particularly methyl, ethyl, cyclohexyl or phenyl, which moiety may be additionally substituted with functional groups. The use of trimethylsilyl groups is particularly advantageous for durably hydrophobicizing the aerogel. Introducing these groups can be accomplished by gas phase reaction between the aerogel and, for example, an activated trialkylsilane derivative, e.g., a chlorotrialkylsilane or a hexaalkyldisilazane (cf. R. Iler, The Chemistry of Silica, Wiley & Sons, 1979).

Functionalizing the Nanoporous Particles

The nanoporous particles, more particularly aerogels, can be fixed in the binder. Fixing the nanoporous particles in the binder can be augmented by introduction of reactive groups into the nanostructure or by incorporating small amounts of binders.

Functionalized chemical compounds such as alkoxysilanes, e.g., 3-aminopropyltriethoxysilane or 3-aminopropyltrimethoxysilane, are useful for chemically functionalizing the nanostructure for example. These reactive groups are bonded to the aerogel in the first step via the silane unit and in the 2nd step the amino group allows chemical attachment to the binder.

Suitable systems for functionalization are described at very great length in WO 2005103107 A1, page 9, line 18 to page 15, line 4, and are expressly incorporated in this application by reference.

Useful binders include polymeric substances, for example melamine-formaldehyde resins. Suitable polyurethane resins, polyester resins or epoxy resins are known to a person skilled in the art. Such resins are found for example in Encyclopedia of Polymer Science and Technology (Wiley) under the following chapters: a) Polyesters, unsaturated: Edition 3, Vol. 11, 2004, p. 41-64; b) Polyurethanes: Edition 3, Vol. 4. 2003, p. 26-72 and c) Epoxy resins: Edition 3, Vol. 9, 2004, p. 678-804. In addition, Ullmann's Encyclopedia of Industrial Chemistry (Wiley) includes the following chapters: a) Polyester resins, unsaturated: Edition 6, Vol. 28, 2003, p. 65-74; b) Polyurethanes: Edition 6, Vol. 28, 2003, p. 667-722 and c) Epoxy resins: Edition 6, Vol. 12, 2003, p. 285-303. It is further possible to use amino- or hydroxyl-functionalized polymers, more particularly a polyvinylamine or polyvinyl alcohol. Examples based on melamine and phenolic resin and also acrylamide are described in EP 0451535B1 and DE 19649796A1.

Binders

The binders to be used according to the present invention are polymers having an amine function. This is to be understood as meaning polymers substituted with amino groups. These amino groups are preferably primary amino groups. In a particularly preferable embodiment, the binder comprises recurring vinylamine units of the formula

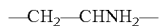

—CH$_2$—CHNH$_2$—

In a very particularly preferable embodiment, the binder is a polyvinylamine, more particularly with a molar mass of 10 000 to 500 000 [g/mol] and preferably of 10 to 400 000. In addition to the amino groups, the polymer chain may display further substituents, more particularly formamide moieties.

In a preferable embodiment, the polyvinylamine is obtainable by free-radical or cationically initiated polymerization of vinylformamide and hydrolysis of formamide groups in the acidic or basic region. Hydrolysis may be complete or partial.

In addition to the binder of the present invention, further organic or inorganic binders can be used in an amount of 0.1-5% by weight, based on the amino-functionalized binder. Further suitable organic binders are for example the binders known from EP 672 635 A1, such as reactive adhesives such as epoxy resin adhesives, reactive polyurethane adhesives, phenol-, resorcinol-, urea- and melamine-formaldehyde resins, silicone resin adhesives, polyimide and polybenzimidazole resins, hot-melt adhesives such as ethylene-vinyl acetate copolymers and polyamides, waxes, and also aqueous disperse adhesives such as styrene-butadiene and styrene-acrylic ester copolymers. The binder may additionally comprise, as indicated in EP 06 72 625 A1, sheet-silicates and/or clay minerals.

To achieve good disbursement of binders in the interstitial void spaces at high aerogel content and very good adherence when solid binders are used, the granules of solid binders should preferably be smaller than the aerogel granules. It may similarly be necessary to employ elevated pressure in processing.

When the binder has to be processed at elevated temperatures as in the case of hot-melt adhesives or reactive adhesives such as melamine-formaldehyde resins for example, the binder has to be chosen such that its melting temperature does not exceed the melting temperature of the fibers.

The binder is generally used in an amount of 1% to 50% by volume of the composite material, preferably in an amount of 1% to 30% by volume. Binder selection is governed by the mechanical and thermal requirements of the composite material and also fire protection requirements.

Crosslinker

The crosslinker is used to obtain a crosslinked binder by reaction with the amino groups of the binder. This crosslinked binder forms a matrix embedding the aerogel. In a particularly preferable embodiment, the binder and the crosslinked binder are hydrophilic. Therefore, the binder and the crosslinked binder will penetrate into the hydrophobic aerogel to a minor degree only, if at all. Useful crosslinkers include all compounds capable of reaction with the binder to be used according to the present invention, more particularly aldehydes, isocyanates, epoxides, acrylates, acrylamides, esters and divinylsulfonates. Glyoxal and ethylene glycol dimethyl ether are particularly useful crosslinkers.

Additives

The composite material may comprise effective amounts of further addition agents such as, for example, dyes, pigments, fillers, flame retardants, synergists for flame retardants, antistats, stabilizers, plasticizers and IR opacifiers.

To reduce the radiative contribution to thermal conductivity, the foam may comprise IR opacifiers such as, for example, metal oxides, nonmetal oxides, metal powders, e.g., aluminum powder, carbon, e.g., carbon black, graphite, diamond or organic dyes and dye pigments, which is advantageous for uses at high temperatures in particular. Particular preference is given to carbon black, titanium dioxide, iron oxides or zirconium dioxide. The aforementioned materials can be used in each case not only singly but also in combination, i.e., in the form of a mixture of two or more materials.

With regard to cracking and breaking strength, it can further be advantageous for the composite material to comprise fibers. As fiber material there may be used organic fibers such as, for example, polypropylene, polyester, nylon or melamine-formaldehyde fibers and/or inorganic fibers, for example glass, mineral and also SiC fibers and/or carbon fibers.

The fire class of the composite material obtained after drying is determined by the fire class of the aerogel and of the inorganic binder and also, as the case may be, the fire class of the optional fiber material. To achieve a very favorable fire class for the composite material (low-flammable or incombustible), the fibers should consist of noncombustible material, e.g., mineral, glass or SiC fibers.

In order to avoid increased thermal conductivity due to added fibers
  a) the volume fraction of fibers should be 0.1 to 30% and preferably 1 to 10%, and
  b) the thermal conductivity of fiber material should preferably be <1 W/m*K.

A suitable choice of fiber diameter and/or material reduces the radiative contribution to thermal conductivity and increases mechanical strength. For this, fiber diameter should preferably be in the range from 0.1 to 30 μm.

The radiative contribution to thermal conductivity can be particularly reduced when using carbon fibers or carbon-containing fibers.

Mechanical strength can further be influenced by fiber length and distribution in the composite material. Preference is given to using fibers between 0.5 and 10 cm in length. Fabrics woven from fibers can also be used for plate-shaped articles.

The composite material may additionally comprise further auxiliary materials, for example Tylose, starch, polyvinyl alcohol and/or wax emulsions. They are used in the prior art on a large industrial scale in the shaping of ceramic compositions.

The composite may further comprise addition agents used in its method of making and/or formed in its method of making, for example slip agents for compression molding, such as zinc stearate, or the reaction products of acidic or acid-detaching cure accelerants in the event of using resins.

The fire class of the composite material is determined by the fire class of the aerogel, of the fibers and of the binder and also of further substances optionally present. To achieve a very favorable fire class for the composite material, it is preferable to use nonflammable types of fibers, for example glass or mineral fibers, or low-flammable types of fibers such as, for example, TREVIRA C® or melamine resin fibers, aerogels based on inorganics and more preferably based on $SiO_2$, and low-flammable binders such as, for example, inorganic binders or urea- or melamine-formaldehyde resins, silicone resin adhesives, polyimide resins and polybenzimidazole resins.

Processing

When the material is used in the form of sheet bodies, for example plates or mats, it may have been laminated on at least one side with at least one covering layer in order that the properties of the surface may be improved, for example to increase the robustness, turn it into a vapor barrier or guard it against easy soiling. The covering layers can also improve the mechanical stability of the composite molding. When covering layers are used on both faces, these covering layers can be identical or different.

Useful covering layers include any materials known to a person skilled in the art. They can be aporous and hence act as vapor barrier, for example polymeric foils, preferably metal foils or metalized polymeric foils that reflect thermal radiation. But it is also possible to use porous covering layers which allow air to penetrate into the material and hence lead to superior acoustical insulation, examples being porous foils, papers, wovens or nonwovens.

Lamination may further be effected for example, with substantial retention of the acoustical properties, with so-called "open" systems, for example perforated plates.

The covering layers may themselves also consist of two or more layers. The covering layers can be secured with the binder with which the fibers and the aerogel particles are bonded to and between each other, but it is also possible to use some other adhesive.

The surface of the composite material can be closed and consolidated by incorporating at least one suitable material into a surface layer. Useful materials include, for example, thermoplastic polymers, e.g., polyethylene or polypropylene, or resins such as melamine-formaldehyde resins for example.

The composite materials of the present invention have thermal conductivities between 10 and 100 mW/mK, preferably in the range from 10 to 50 mW/mK and more preferably in the range from 15 to 40 mW/mK.

Producing the Composite Materials

The composite materials of the present invention are preferably produced by mixing an aerogel, a binder and a crosslinker with one another, the binder being a polymer substituted with amino groups, maintaining the mixture at a temperature of preferably 60-100° C. to react the crosslinker with the binder, and preferably the mass is cured in a mold.

Silica-aerogel particles having a median diameter $d_m$ between 0.001 and 8 mm coated and/or mixed with an aqueous suspension comprising sheet-silicates and/or clay minerals and at least one organic or inorganic binder, and the mass cured in a mold.

In a preferable embodiment of the process according to the present invention, the mold is moisture permeable and hydrophobic at the inner surfaces.

This can be accomplished for example by superposing metal sieves and suitable polymeric foils.

In a preferable embodiment, the composite materials of the present invention are combined with other foams, for example polyurethane and/or polystyrene foams. In a particularly preferable embodiment, the composite material of the present invention is laminated with expanded polystyrene. In a further particularly preferable embodiment, the composite material of the present invention is admixed with polystyrene foams, more particularly expanded polystyrene. The mixing ratio is easily adapted to the particular requirements and can be for example in a volume ratio of 10:90 to 90:10.

The composite materials of the present invention have outstanding mechanical properties (enhanced breaking strength for example) and thermal insulation properties (thermal conductivities of less than 0.025 W/m*K can be achieved in general) and so can be used in a wide variety of fields.

Examples thereof are the thermal insulation of buildings, fuel boilers, cooling appliances, baking ovens (cf. EP-A-0 475 285), heating pipes, district heating lines, liquid gas containers, night storage ovens and also vacuum insulation in technical appliances of various kinds.

More particularly, the composite materials of the present invention are useful for internal insulation to achieve a low-energy standard, for external insulation, optionally combined with cementitious and inorganic adhesives, and also as part of a combination of base render, reinforcing mortar and top render, for roof insulation, and also in technical applications in refrigerators, transportation boxes, sandwich elements, pipe insulation and technical foams.

A further advantage of composite materials according to the present invention is therebesides that their surface is homogeneous and smooth. The composite materials are also particularly simple to work/machine by sawing, sanding or cutting. Individual aerogel particles do not detach in the process, so that the worked/machined surfaces also have a homogeneous appearance.

EXAMPLES

Example 1 (Invention)

200 g of an organomodified $SiO_2$ aerogel (99.2% by volume), 300 g of Lupamin® type 9095 polyvinylamine (10% aqueous solution), 20 g of water and 1.7 g of glyoxal as crosslinker were mixed and introduced into a mold (basal area: 20 cm*20 cm). The granular aerogel had a granule size ranging from 0.1 to 4.0 mm, a bulk density of 80 to 100 kg/m³ and a thermal conductivity of about 18 mW/m*K. The plate was dried at 70° C. in a drying cabinet. The shaped article obtained as a mechanically stable plate (20 cm*20 cm*4 cm) had a density of 130 g/l and a thermal conductivity of 16.7 mW/m*K.

Example 2 (Comparitor)

780 g of Lupamin® type 9095 polyvinylamine (10% aqueous solution) were mixed with 780 g of an organomodified SiO2 aerogel from example 1, 78 g of water and 7 g of glyoxal as crosslinker. The mass thus obtained was introduced into a 50 cm*50 cm*5 cm mold and pressed between 2 hotplates (at 90° C.). After 3 hours, the plate was demolded and dried at 70° C. in a drying cabinet to constant weight.

The shaped article obtained as a mechanically stable plate (50 cm*50 cm*5 cm) has a density of 140 g/l and a thermal conductivity of 16.2 mW/m*K.

The plate was subjected to physical measurements, the results of which are summarized in the following table:
Lambda value: 16.2 mW/m*K
Compressive strength: 194 kPa
Flexural strength: 100 kPa
Density: 140 g/l Example 3

A disk 2 cm in thickness was cut from the plate of example 1 (density 130 g/l) and had a Neopor plate 1 cm in thickness adhered to it top and bottom. The density and the mechanical properties are further improved:
Lambda value: 22.4 mW/m*K
Density: 60 g/l
Flexural strength: 222 kPa
Compressive strength: 170 kPa Example 4

100 g of an organomodified SiO2 aerogel (about 45% by volume), 200 g of Lupamin® type 9095 polyvinylamine (10% aqueous solution), 20 g of water and 1.7 g of glyoxal as crosslinker were mixed and introduced into a mold with 30 g of Neopor® type P5300 (about 55% by volume) (basal area: 20 cm*20 cm). The plate was dried at 60° C. in a drying cabinet.

The shaped article obtained as a mechanically stable plate (20 cm*20 cm*4 cm) has the following values:
Lambda value: 24 mW/m*K
Density: 100 g/l

We claim:

1. A composite material comprising aerogel $SiO_2$ particles and a crosslinked binder, the aerogel particles fixed in the crosslinked binder, wherein the aerogel particles have an organo-modified surface with hydrophobic groups, and the crosslinked binder forms a matrix embedding the aerogel particles, and wherein a crosslinker is selected from the group consisting of aldehydes, isocyanates, epoxides, acrylates, acrylamides, esters and divinylsulfonates, and the binder is a polymer substituted with amino groups, and the binder and the crosslinked binder are hydrophilic, wherein the proportion of the aerogel particles in the composite material is 5 to 99% by volume.

2. The composite material according to claim 1, wherein the aerogel particles have a $D_{50}$ value of 0.1 to 100 μm.

3. The composite material of claim 2, wherein the aerogel particles have a $D_{50}$ value of 1-30 μm.

4. The composite material according to claim 1, wherein the aerogel particles have a porosity of 50 to 99% by volume.

5. The composite material according to claim 1, wherein the binder includes recurring polymerized units of vinylamine.

6. The composite material according to claim 1, wherein the binder is a polyvinylamine.

7. The composite material according to claim 6, wherein the binder has a molar mass of 10,000 to 500,000 g/mol.

8. The composite material according to claim 1, wherein the crosslinker has groups that react with the amino groups of the binder.

9. The composite material according to claim 1, wherein the crosslinker is glyoxal.

10. A shaped article comprising the composite material according to claim 1 and a foam material.

11. The shaped article according to claim 10, wherein the foam material is selected from polyurethane or polystyrene.

12. The shaped article according to claim 10, wherein the foam material is laminated to the composite material.

13. The composite material according to claim 1, wherein the binder is present from 10 to 25 parts by weight, the crosslinker is present from 0.5 to 5 parts by weight, based upon 100 parts by weight of aerogel.

14. A process for producing the composite material according to claim 1, which comprises mixing the aerogel particles, the binder and the crosslinker, performing the crosslinking by reacting the crosslinker with the amino groups of the binder, and the material obtained is either
    a. subjected directly to a shaping operation and optionally curing, or
    b. pelletized, stored and subjected to shaping and curing as or when required.

15. A composite material comprising amino functionalized aerogel particles and a crosslinked binder, wherein the amino functionalized aerogel particles include a surface with silane hydrophobic groups, and the crosslinked binder forms a matrix embedding the aerogel particles, and wherein the crosslinked binder is obtained from a polymer substituted with amino groups and a crosslinker selected from the group consisting of aldehydes, isocyanates, epoxides, acrylates, acrylamides, esters and divinylsulfonates, wherein the crosslinker also reacts with the amino functionalized aerogel particles to fix the aerogel particles to the crosslinked binder.

16. The composite material according to claim 15, wherein the binder is a polyvinylamine, and the crosslinker is selected from glyoxal or ethylene glycol dimethyl ether.

17. A shaped article comprising the composite material according to claim 15, which is admixed with expanded polystyrene in a volume ratio of composite material to polystyrene of 10:90 to 90:10 to form the shaped article.

18. The composite material according to claim 15, wherein the aerogel particles have a $D_{50}$ value of 1-30 μm, and a porosity of 50 to 99% by volume.

\* \* \* \* \*